US005651603A

United States Patent [19]

Döring

[11] Patent Number: 5,651,603

[45] Date of Patent: Jul. 29, 1997

[54] APPARATUS FOR ARRANGING A LAMP ON A REFLECTOR OF A VEHICLE HEADLIGHT

[75] Inventor: Berthold Döring, Werl-Büderich, Germany

[73] Assignee: Hella KG Hueck & Co., Lippstadt, Germany

[21] Appl. No.: 438,081

[22] Filed: May 8, 1995

[30] Foreign Application Priority Data

May 13, 1994 [DE] Germany .......................... 44 16 925.6

[51] Int. Cl.[6] .............................. H01R 33/00; B60Q 1/04

[52] U.S. Cl. ............................ 362/61; 362/226; 362/457

[58] Field of Search ................................ 362/61, 80, 310, 362/226, 457, 396, 444, 440, 382, 436

[56] References Cited

U.S. PATENT DOCUMENTS

| | | | |
|---|---|---|---|
| 4,670,822 | 6/1987 | Baker | 362/226 |
| 4,811,178 | 3/1989 | Ernst et al. | 362/226 |
| 4,872,096 | 10/1989 | Montet | 362/226 |
| 4,890,202 | 12/1989 | Blanche | 362/226 |
| 4,922,388 | 5/1990 | Freudenreich | 362/226 X |
| 4,933,819 | 6/1990 | Mohsakowski et al. | 362/226 X |
| 5,361,191 | 11/1994 | Matsuzaki et al. | 362/226 X |

FOREIGN PATENT DOCUMENTS

| | | |
|---|---|---|
| 2 669 400 A1 | 5/1992 | France . |
| 28 53227 A1 | 6/1980 | Germany . |
| 3933347A1 | 4/1991 | Germany . |
| 9104169 U | 7/1992 | Germany . |

*Primary Examiner*—Ira S. Lazarus
*Assistant Examiner*—Thomas M. Sember
*Attorney, Agent, or Firm*—Griffin, Butler, Whisenhunt & Kurtossy

[57] ABSTRACT

An opening (3) in a reflector (2) of a vehicle headlight serves to receive a lamp (1). The lamp can be seated against a surface with three support points (4) facing a direction opposite to a mounting direction. The support points are at apexes of a triangle (30) surrounding a lamp axis (7). One of these support points corresponds to a positioning tab (8) extending radially outwardly from a lamp socket (5) which can be seated in a recess (9). A spring holding element (10) applies a force on the socket of the lamp between the positioning tab and the lamp axis in a mounting direction of the lamp as well as toward a fixing element (11).

8 Claims, 2 Drawing Sheets

APPARATUS FOR ARRANGING A LAMP ON A REFLECTOR OF A VEHICLE HEADLIGHT

BACKGROUND OF THE INVENTION

This invention relates generally to an apparatus for mounting a lamp on a reflector of a vehicle headlight, the apparatus defining an opening for receiving the lamp and a surface facing opposite a mounting direction of the lamp, there being three support points formed by the surface for a lamp socket, which points define a perimeter triangle, with one of the support points being arranged to correspond to a positioning tab extending radially outwardly from the socket, the positioning tab being seated in a recess, and the apparatus having a spring holding element with which a side of the socket, diametrically opposite the positioning tab relative to the lamp axis, can be pressed against a fixing element.

Such an apparatus for arranging a lamp on a reflector of a vehicle headlight is disclosed in german Gebrauchsmuster 91 04 169. A lamp is mounted in a ring-shaped lamp carrier constructed of resinous plastic. The lamp carrier is attached on a rear side of a reflector constructed of sheet metal and extends about an opening in the reflector. A bulb having a lamp filament therein is extendable through the opening of the reflector and a flange which surrounds the rest of the socket is seated against a surface facing opposite to a mounting direction of the lamp. Contact of the socket flange with the surface occurs at three support points which define the points of an equilateral triangle, with a lamp axis extending approximate through a center of gravity thereof. One of the three support points corresponds to a positioning tab which extends radially outwardly from the flange as a part thereof. An axis of symmetry, or bisector axis, of the triangle extends through the positioning tab, the support point of the positioning tab and the lamp axis. The positioning tab is formed by two recesses in the flange, each respectively having two sides extending at right angles to one another. Respective ones of the sides defining the recesses are adjacent the positioning tab while the other two sides of the recesses extend on a common line. The opening in the lamp carrier accommodates the socket flange and the positioning tab which is cut out of the socket flange. Further, a spring holding element lies on the axis of symmetry of the triangle formed by the support points extending through the positioning tab, the spring holding element being a spring tongue formed on the lamp carrier with its free end lying, under tension, against a free edge of the positioning tab to press the flange of the socket against a circularly curved shaped interior side of the opening of the lamp carrier with a spring force directed along the axis of symmetry toward the lamp axis. Further, a second spring tongue formed on the lamp carrier serving to attach the lamp can be placed under tension against one of the two small side surfaces of the positioning tab which are parallel to one another and to the axis of symmetry. In this manner, the exact angular position of the lamp is determined. It is, in this regard, disadvantageous that two spring tongues are formed on the lamp carrier for determining the radial position and the angular position of the lamp and that an interior surface forming an opening in the lamp carrier is adapted for the exterior surface shape of the flange of the socket having the positioning tab. Further, an additional spring holding element is necessary to attach the lamp in a direction of the lamp axis, which can be a holding spring, for example, for pressing the flange of the socket against the support surface of the lamp carrier. Further, an exact position of the filament of the lamp relative to the reflection surface of the reflector is also not certain, even when the lamp is properly arranged on the lamp carrier, because the lamp carrier is a separate part and must still be arranged relative to the reflection surface of the reflector.

In german patent publication 28 53 227 A1 a vehicle headlight is disclosed with an apparatus in which a lamp is attachable in an opening of a separate lamp carrier by a single spring holding element, both radially and axially. The spring holding element is a bowed metal strip spring of which a free end portion lies at an edge of a socket plate and presses this edge of the socket plate axially as well as radially. So that a side of the socket plate opposite the spring holding element does not rise up from its support surface, it is, at this side, shoved into a radially open recess of the lamp carrier. This does not assure a rattle free seating of the lamp on the lamp carrier. Further, it is not possible to align the separate lamp carrier exactly relative to a reflection surface of a reflector.

An apparatus of a vehicle headlight disclosed in german patent publication 39 33 347 A1 has a U-shaped bent holding wire spring with which a lamp is attached radially as well as axially in an opening of a reflector. The holding spring's two legs span a socket of the lamp and press it axially, with both legs, against a support surface of the reflector. Between a pivoting position of the holding spring and a cylindrical socket portion both legs have a bend which reduces their spacing from one another. One respective side of each of the bends of the two legs lies against the cylindrical socket portion of the lamp and presses away from the pivoting position of the holding spring, and thereby in the direction in the length extension of the respective leg. The bending of both legs must always have a very exact tolerance so that it can be assured that both legs press against the cylindrical socket of the lamp, because otherwise the lamp will be urged in an undesired radial direction.

It is an object of this invention to provide an apparatus for mounting a lamp on a reflector of a vehicle headlight of the type described in the introductory paragraph above with which the lamp is sufficiently strongly held by a single spring holding element axially and radially relative to a lamp axis, with such a holding being possible with only a single engagement point between the spring holding element and the socket of the lamp so that the holding spring and its attaching elements need not have exact tolerances.

SUMMARY OF THE INVENTION

According to principles of this invention, a spring holding element applies a spring force on a socket of a lamp at a position between a support point corresponding to a positioning tab and a lamp axis (optical axis) in an operational direction of the lamp and toward a fixing element.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
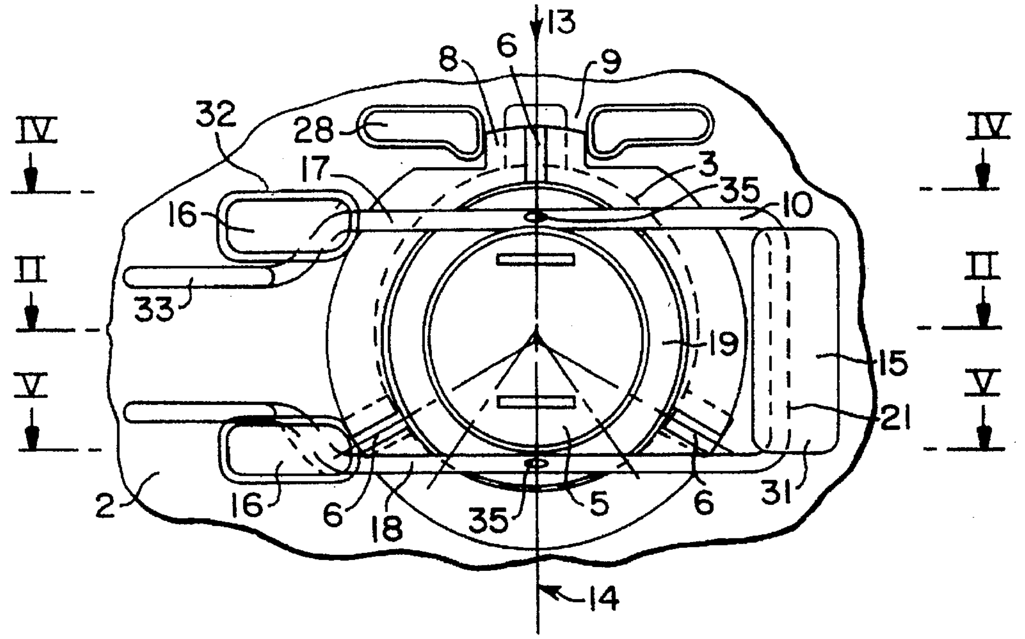
FIG. 1 is a segmented plan view of a back side of a reflector of a vehicle headlight with an apparatus of this invention attaching a lamp thereto.
Figure 2:
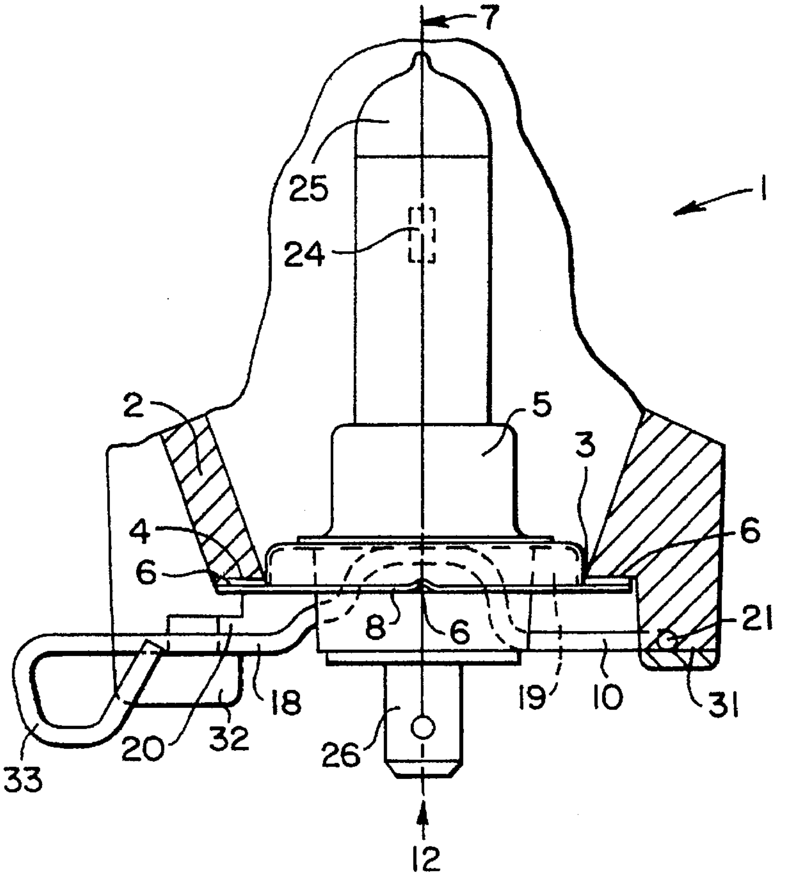
FIG. 2 is a segmented cross sectional view taken on line II—II in FIG. 1 through the apparatus and the lamp.
Figure 3:
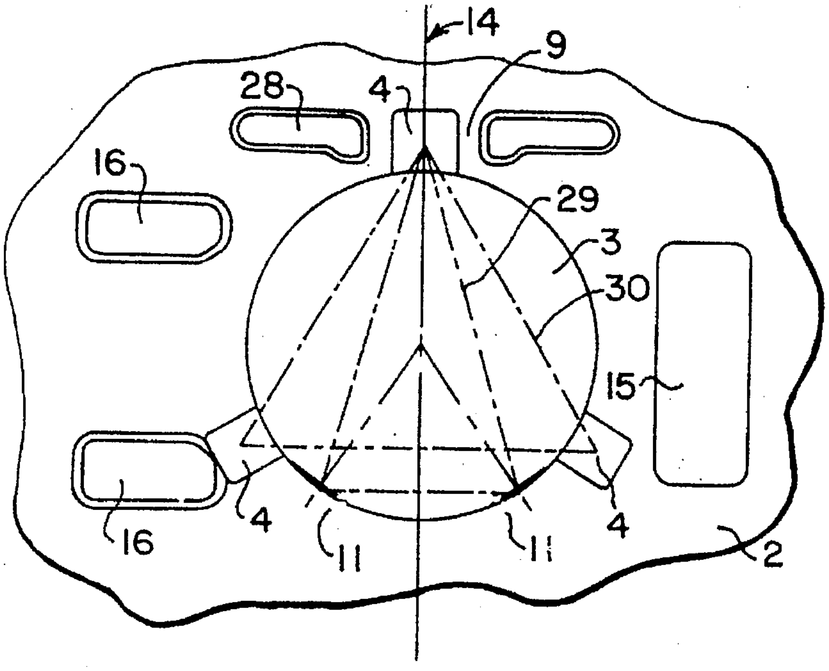
FIG. 3 is a plan view of the reflector of FIG. 1 as an individual part.
Figure 5:
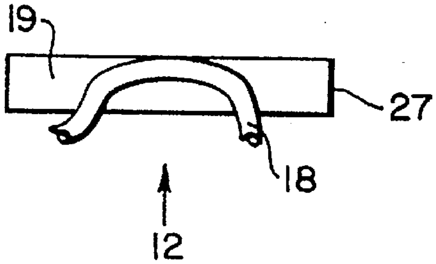
FIG. 5 is a segmented cross sectional view taken on line V—V in FIG. 1.

A bowl shaped reflector 2 manufactured of resinous plastic has, in an area of its apex, a circular opening 3. A lamp 1 is mounted in the opening 3 and can be held in the opening 3 by a spring holding element 10.

The lamp 1 has a cylindrical socket, or base, 5 of sheet metal. A bulb 25 having a filament 24 therein is attached on a top surface of the cylindrically shaped socket 5 while plugs 26, serving as electrical contact terminals, are mounted on the other main surface of the cylindrically shaped socket 5. The cylindrically shaped socket 5 has a socket plate 27 whose perimeter free edge is directed radially outwardly. A ring groove 19 is in the socket plate 27 on a side thereof facing the electrical plug 26 and three radially-extending slots (radial to a lamp axis 7) are uniformly distributed about free edge portions of the perimeter of the socket plate 27, adjacent the ring groove, with their external surfaces facing the glass bulb 25 to serve as support points 6 for the lamp 1. The support points 6 are at the angles, or points, of an equilateral triangle 30, approximately through whose center of gravity the lamp axis 7 extends. One of the support points 6 corresponds to, or is at, a positioning tab 8, which is formed by two right angle cuts, or blankings, in the peripheral portion of the socket plate 27. The free end of the positioning tab 8 extends radially outwardly.

Outwardly directed surfaces 4 on raised areas, which are adjacent the opening 3 in the reflector 2 of resinous plastic are surfaces 4 on which the support points 6 of the lamp 1 engage. The opening 3 of the reflector 2 is substantially larger than a cylindrical portion of the socket plate 27 which extends thereinto. The latter cylindrical portion is formed at the outer surface of a member defining the ring groove 19 of the socket plate 27. The positioning tab 8 is, with a small amount of play, mounted in a recess 9 defined by two projections 28 formed on the backside of the reflector 2. The projections 28 extend into the right angled slots on the sides of the positioning tab 8. The cylindrical portion of the socket plate 27 lies against a fixing element 11 on a side diametrically opposite the positioning tab 8. The fixing element 11 is formed of two fixing points which are flattened areas on an interior surface defining the opening 3. Both fixing points 11 lie symmetrical to a line 14 which extends through the middle of the positioning tab 8 and the lamp axis 7. Both of the fixing points 11 and the positioning tab 8 are at the points of an isosceles triangle 29 of which a side between the two fixing points 11 is substantially smaller than the equal sides. The line 14 is a symetrical axis, or bisecting axis, to the isosceles triangle 29 and to the equilateral triangle 30 whose angles are formed at the support points 6 of the lamp 1 and the support surfaces 4.

The spring holing element 10 is bent to have a U-shape. The legs 17 and 18 of the holding element 10 extend horizontally along their length and a connecting lug 21 for the legs 18 and 19 extends vertically. The lug 21 is pivotally mounted in a protrusion 31 formed on the backside of the reflector 2. The protrusion 31 has end surfaces which border on the two legs 17, 18 of the holding element 10 so that the position of the connecting lug 21 is fixed along its length. The legs 17, 18 span the socket plate 27 on opposite sides of the cylindrically shaped socket 5 and their free end portions are respectively releasably attached to protrusions 32 formed on the rear side of the reflector 2. Each of the protrusions 32 has a recess 20 with an open side 20 for receiving the free end portion of its respective leg 17, 18. Free ends of the legs 17, 18 are bent to form eyelets 33 which serve as handles for releasing the holding element 10. When the two eyelets 33 are pressed together the free end portions of the legs 17 and 18 release from their engagement with the recesses 20 of the protrusions 32 and the legs can be pivoted away from the lamp 1. Once the two eyelets 33 are released, both legs 17 and 18 spring apart. Thereafter, the lamp 1 can be simply and quickly replace by a new one. So that the lamp 1 can be attached to the reflector 2, free end portions of the holding element 10 can be pivoted toward the lamp 1 and, upon the two eyelets 33 being pressed together, can be pivoted between the two protrusions 32. Once the two eyelets 33 have been released each of the two end portions of the legs 17, 18 springs into a recess 20 of the protrusions 32. Thus, the lamp is affixed on the reflector 2.

Figure 4:
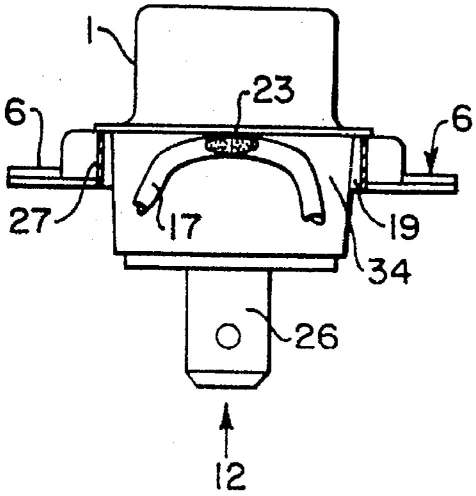
FIG. 4 is a segmented cross sectional view taken on line IV—IV in FIG. 1.

Both legs 17, 18 are, in the area of the socket plate 27 bowed, or bent, toward the socket plate 27 and engage in the ring groove 19 of the socket plate 27. The leg 17, which is adjacent to the positioning tab 8, exerts a spring force 12 on a floor of the ring groove 19 in the direction of the lamp axis 7 and exerts a spring force 13 in a direction radial to the lamp axis 7, which substantially corresponds to a line 14, on an interior inner surface 34 defining the ring groove 19. A shoulder 31 serves as a spring pivot for applying the spring forces 12, 13 and the protrusion 32, which receives the free end portion of the leg 17, serves as a counter support 17 and 16. A bearing surface 23 is shown in FIG. 4 at which the leg 17 presses radially against the interior 34 of the socket 5. Two bearing surfaces 35 are shown in FIG. 1 with which the legs 17, 18 press against the floor of the ring groove 19. The lamp 1 is held in the opening 3, radially as well as axially, even without the leg 18 because the bearing surfaces 23 and 35 of the leg 18 lie in the equilateral triangle 30 whose angles are at the support points 6 of the lamp 1 and lie on the line 14, which is the symmetrical axis, or bisector, of the isosceles triangle 29 whose points, or angles, are formed by the fixing points 11 and the positioning tab 8.

Because it leads to a sufficiently sure and solid attachment of the lamp if the holding element presses under tension against an engagement point of the socket, the holding element can be attached directly to the reflector. Additionally, no further separate lamp support, or carrier, must be used, thus, a very exact attachment of the lamp to the reflection surface of the reflector can be achieved. Still further, it is beneficial that the positioning tab can be easily shoved into the recess with a small amount of play between it and the recess. In this manner, the lamp can be fixed exactly in its angular position and, after the holding element has been mounted on the socket of the lamp, it can be assured that the socket is positioned radially to the lamp axis against the fixing element.

In this regard, it is further beneficial that the fixing element at the interior surface defining the lamp-receiving opening comprises two separated fixing points between which a line extends intersects the lamp axis which passes through the receiver for the positioning tab. Flattened areas or raised areas formed on the inner surface defining the opening can serve as the fixing points. Because the exactly-located positioning tab and the two positioning points are the points of a triangle, an extremely exact radial positioning of the lamp is assured. When this is done, a line extending intermediate the two fixing points should be a symmetrical axis of the above mentioned triangle and of a triangle whose angles are formed at the support points.

Further, it is beneficial that the spring holding element extends across the socket away from the middle with each end portion respectively forming a counter spring support for a radial as well as an axial direction relative to the lamp axis. Such a structure is extremely uncomplicated and cost effective to manufacture.

In the particularly beneficial depicted embodiment of the invention the spring holding element has a U-shape whereby both legs press the socket axially against the surface and radially against the fixing element. In this manner, the lamp is securely held in a radial as well as an axial direction.

In this regard, it is further beneficial that each of the legs of the U-shaped holding element respectively dips into diametrically oppositely-lying sides of a ring groove with each leg lying on the floor of the ring groove and one leg lying on one interior side and the other leg on the other interior side under tension. With such an arrangement, the holding element can be placed simply and easily against the socket of the lamp under tension.

Further, it is beneficial that the legs of a holding element, for a mounted lamp, spring outwardly and that both free end portions of the U-shaped holding element respectively can be placed in a slit-like recesses, with open sides of the recesses facing one another and the spring holding element pivoting at the lug joining the legs. In this manner, it is assured that the lamp is mounted on the reflector to be rattle free, even for rough tolerances of the holding element and its engagement surfaces.

It is particularly beneficial that the fixing element can be molded by a mold which forms the reflection surface of the reflector. In this manner, the lamp is arranged quite accurately relative to the reflection surface of the reflector.

The embodiments of the invention in which an exclusive property or privilege are claimed are defined as follows:

1. Apparatus for arranging a lamp on a reflector of a vehicle headlight, said apparatus comprising a carrier, a lamp socket, and a spring holding element, said carrier defining an opening (3) for receiving the lamp, said carrier having a surface (4) facing an opposite direction than a mounting direction of the lamp, with three support areas (6) being between the surface and the lamp socket (5) which lie at angles of a triangle (30) surrounding a lamp axis (7) extending in an operational direction of the lamp and of which one of said support areas (6) is arranged to correspond to a positioning tab (8) extending radially outwardly from the lamp socket (5), the positioning tab (8) being seatable in a recess (9) formed in the carrier, said spring holding element (10) mounted on said carrier to act on said lamp socket for urging said lamp socket radially, relative to the lamp axis (7), toward a fixing element (11) on said carrier at a side of the lamp socket (5) diametrically opposite the positioning tab (8):

wherein the spring holding element (10) applies a spring force on the lamp socket of the lamp at a position between the one support area (6), corresponding to the positioning tab (8), and the lamp axis (7) which spring force has a first spring force component (12) acting in a mounting direction of the lamp (1) and a second spring force component (13) acting toward the fixing element (11);

wherein the spring holding element (10) is formed as an elongated member extending across the lamp socket (5); and wherein said carrier has respective counter support bearings (15, 16) for supporting opposite ends of said spring holding element to cause said first and second spring force components (12, 13).

2. Apparatus as in claim 1 wherein an interior surface of the carrier forming the opening (3) for receiving the lamp (1) defines the fixing element (11).

3. Apparatus as in claim 1 wherein the fixing element comprise two separated fixing points between which a line (14), which extends through a recess (9) for the positioning tab (8) and intersects the lamp axis (7), extends.

4. Apparatus as in claim 3 wherein each of the fixing points (11) are formations placed on an interior surface defining the opening (3).

5. Apparatus as in claim 1 wherein the spring holding element (10) has a U-shape with both legs (17, 18) pressing the lamp socket (5) axially against the surface (4).

6. Apparatus as in claim 5 wherein the legs (17, 18) of the holding element (10), for a mounted lamp (1), spring outwardly.

7. Apparatus as in claim 5 wherein both free end portions of the U-shaped holding element (10) respectively can be placed in slit-like recesses (20) whereby open sides of both recesses face one another and the spring holding element (10) is pivotal about a lug (21) coupling the legs.

8. Apparatus as in claim 1 wherein the carrier is formed as one piece with the reflector so that it is part of the reflector.

* * * * *